(12) United States Patent
Wood et al.

(10) Patent No.: US 7,775,478 B2
(45) Date of Patent: Aug. 17, 2010

(54) FLOOR BEAM ASSEMBLY, SYSTEM, AND ASSOCIATED METHOD

(75) Inventors: Jeffrey H. Wood, Eureka, MO (US); John H. Fogarty, Lake St. Louis, MO (US)

(73) Assignee: The Boeing Company, Chicago, IL (US)

( * ) Notice: Subject to any disclaimer, the term of this patent is extended or adjusted under 35 U.S.C. 154(b) by 463 days.

(21) Appl. No.: 11/537,145

(22) Filed: Sep. 29, 2006

(65) Prior Publication Data

US 2008/0078129 A1    Apr. 3, 2008

(51) Int. Cl.
*E04B 1/32* (2006.01)
*B64C 1/00* (2006.01)

(52) U.S. Cl. ............ 244/119; 52/582.2; 52/289; 52/702; 52/246; 52/745.05

(58) Field of Classification Search .......... 244/119; 52/245, 246, 261, 263, 650.3, 69, 70, 71, 52/289, 702, 655.1, 127.8, 167.1, 167.3, 52/167.4, 167.8, 651.1, 282.5, 582.1, 582.2, 52/745.05

See application file for complete search history.

(56) References Cited

U.S. PATENT DOCUMENTS

| | | | | |
|---|---|---|---|---|
| 436,767 A * | 9/1890 | Baker | .................... | 52/289 |
| 1,282,090 A * | 10/1918 | Lemme | .................. | 52/592.4 |
| 1,900,274 A * | 3/1933 | Brockie | ................. | 135/147 |
| 2,167,557 A * | 7/1939 | Stout | ...................... | 52/69 |
| 2,849,205 A * | 8/1958 | Chapin, Jr. | ............ | 248/282.1 |
| 3,103,025 A * | 9/1963 | Gassner et al. | ........ | 14/6 |
| 3,843,154 A * | 10/1974 | Thompson | ............ | 280/766.1 |
| 4,045,926 A * | 9/1977 | Gibbs | .................... | 52/66 |
| 4,084,789 A * | 4/1978 | Francis | ................. | 254/418 |
| 4,185,799 A | 1/1980 | Richards, Jr. | | |
| 4,261,155 A * | 4/1981 | Gilb | ....................... | 52/702 |
| 4,409,765 A * | 10/1983 | Pall | ........................ | 52/167.1 |
| 4,479,621 A | 10/1984 | Bergholz | | |
| 4,531,334 A * | 7/1985 | Nylander et al. | ...... | 52/109 |
| 4,926,590 A * | 5/1990 | Harris | .................. | 52/8 |
| 4,964,775 A * | 10/1990 | Youmans | ............. | 414/12 |
| 4,989,809 A | 2/1991 | Arnold | | |
| 5,016,403 A * | 5/1991 | Fujita | ................... | 52/7 |
| 5,240,342 A * | 8/1993 | Kresa, Jr. | ............. | 403/232.1 |
| RE34,468 E * | 12/1993 | Rau et al. | ............. | 296/26.02 |
| 5,711,504 A * | 1/1998 | Cusimano | ............ | 248/354.3 |
| 5,778,604 A * | 7/1998 | Snow | ................... | 52/66 |

(Continued)

FOREIGN PATENT DOCUMENTS

JP      06158875 A  *  6/1994

*Primary Examiner*—Robert J Canfield
*Assistant Examiner*—Brent W Herring
(74) *Attorney, Agent, or Firm*—Alston & Bird LLP (57) ABSTRACT

A floor beam assembly, system, and method for installing floor beams within a structure are provided. According to one embodiment, a floor beam assembly for installing a floor beam within a structure is provided. The assembly includes at least one floor beam and at least one floor beam bracket attached to a respective floor beam. The assembly also includes at least one pivot arm pivotally attached to the structure. In addition, the assembly includes a pad attached to the at least one pivot arm, wherein the at least one pivot arm is configured to pivot the pad to a position proximate to a respective floor beam bracket to be attached thereto.

34 Claims, 7 Drawing Sheets

U.S. PATENT DOCUMENTS

| | | | |
|---|---|---|---|
| 6,018,920 A * | 2/2000 | Fancher | 52/582.2 |
| 6,086,018 A | 7/2000 | Gobeil et al. | |
| 6,142,488 A * | 11/2000 | Orr | 280/6.153 |
| 6,164,017 A * | 12/2000 | Burton | 52/7 |
| 6,247,286 B1 * | 6/2001 | Heyns | 52/589.1 |
| 6,381,907 B1 * | 5/2002 | MacKarvich | 52/126.6 |
| 6,438,905 B2 * | 8/2002 | Constantinou | 52/167.3 |
| 6,729,075 B2 * | 5/2004 | Jines et al. | 52/7 |
| 6,735,917 B1 * | 5/2004 | Notermann | 52/656.9 |
| 6,837,010 B2 * | 1/2005 | Powell et al. | 52/167.3 |
| 6,840,016 B1 * | 1/2005 | Mualla | 52/167.1 |
| 7,107,734 B2 * | 9/2006 | Jines et al. | 52/655.1 |
| 7,191,982 B2 * | 3/2007 | Vetillard et al. | 244/119 |
| 7,475,850 B2 * | 1/2009 | Vetillard et al. | 244/117 R |
| 2003/0221379 A1 * | 12/2003 | Oliver et al. | 52/167.1 |
| 2004/0163355 A1 * | 8/2004 | Collie | 52/702 |
| 2005/0108959 A1 * | 5/2005 | Powell et al. | 52/167.1 |
| 2005/0115170 A1 * | 6/2005 | Mualla | 52/167.1 |
| 2006/0006283 A1 | 1/2006 | Vetillard et al. | |
| 2006/0006284 A1 | 1/2006 | Vetillard et al. | |
| 2006/0049600 A1 * | 3/2006 | Dudding et al. | 280/124.11 |
| 2009/0236472 A1 * | 9/2009 | Wood | 244/119 |

* cited by examiner

FLOOR BEAM ASSEMBLY, SYSTEM, AND ASSOCIATED METHOD

BACKGROUND OF THE INVENTION

1) Field of the Invention

Embodiments of the present invention relate to floor beams and, more particularly, to apparatus, systems, and methods for installing floor beams within a structure.

2) Description of Related Art

The floor of an aircraft is typically built up from a series of spaced apart transverse floor beams that span across oval hoop frames to form the structural framework for the aircraft fuselage. The floor beams are usually aluminum and are individually attached with fasteners at each end to the hoop frames via a lap joint. The joint formed between the floor beam and the hoop frame bears the transverse and shear loads applied to the floor beam. Loads applied in the fore and aft direction are bore by longitudinal shear trusses between the floor and the fuselage floor.

Current techniques for joining the floor beams and hoop frames require precise installation of mate-drilled holes between the floor beams and the hoop frames to ensure proper hole alignment for the fasteners. Once the floor beams are installed, the individual components comprising the floor assembly (e.g., seat tracks, floor panels, etc.) are subsequently attached to the floor beams. Future aircraft are moving away from aluminum to lightweight materials, such as composite materials. The use of composite material creates unique design, integration, and assembly issues that would normally not be problematic with respect to metallic materials.

It would therefore be advantageous to provide an assembly, a system, and a method for installing floor beams within a structure. In addition, it would be advantageous to provide an improved assembly, a system, and a method for installing floor beams within a structure that provide adequate support from loads applied to the floor beams. Moreover, it would be further advantageous to provide an assembly, a system, and a method for more efficiently and effectively installing floor beams within a structure.

BRIEF SUMMARY OF THE INVENTION

Embodiments of the invention may address at least some of the above needs and achieve other advantages by providing an assembly, a system, and a method for installing floor beams within a structure. Generally, embodiments of the present invention include floor beams supported by brackets secured to a structure, such as an aircraft structure. Pads that are coupled to the aircraft structure may be pivoted to attach to respective floor beams once the floor beams are positioned on the brackets. Fasteners need not necessarily be used to attach the pads to the floor beams, which may reduce the incidence of misalignment and the installation time. The floor beams may be pre-assembled with the floor panel such that the floor assembly may be quickly secured to the aircraft structure.

In one embodiment of the present invention, a floor beam assembly for installing a floor beam within a structure is provided. The assembly includes at least one floor beam and at least one floor beam bracket attached to a respective floor beam. The assembly also includes at least one pivot arm pivotally attached to the structure. In addition, the assembly includes a pad attached to the at least one pivot arm, wherein the at least one pivot arm is configured to pivot the pad to a position proximate to a respective floor beam bracket to be attached thereto.

According to aspects of the assembly, each pad is pivotally attached to the at least one pivot arm such that each pad is capable of pivoting relative to the pivot arm to align with a respective floor beam bracket. In addition, the assembly may include an adhesive applied to each pad and/or a mating surface of each floor beam bracket. The adhesive could be a two-part paste adhesive. Each pad may be attached to a pair of pivot arms. The floor beams may be a composite material. Furthermore, a mating surface area of each floor beam bracket may be larger than a mating surface area of a respective pad. The assembly could further include at least one support bracket attached to the structure and configured to support at least a portion of the at least one floor beam thereon. Each floor beam may be supported by at least one support bracket without being attached to the support bracket.

An additional aspect of the present invention includes a system for installing a floor beam assembly within a structure. The system includes a structure (e.g., aircraft structure) comprising a plurality of support members (e.g., hoop frames), and a plurality of floor beams positioned proximate to at least one of the support members. The system also includes at least one floor beam bracket attached to a respective floor beam. Moreover, the system includes at least one pivot arm pivotally attached to at least one of the support members, and a pad attached to the pivot arm, wherein the pivot arm is configured to pivot the pad to a position proximate to a respective floor beam bracket to be attached thereto.

According to various modifications of the system, each pivot arm is directly attached to at least one of the support members. At least a portion of each support member may define an aperture, wherein each pad is configured to be pivoted through the aperture and align with a respective floor beam bracket. The system may include at least one pivot arm bracket attached to a respective support member, and a pair of pivot arms may be attached to a respective pivot arm bracket. Each pad may be pivotally attached to the at least one pivot arm such that the pad may pivot relative to the pivot arm. In addition, the system may further include an adhesive (e.g., a two-part paste adhesive) applied to each pad and/or a mating surface of each floor beam bracket. The system could also include a floor panel positioned adjacent to a plurality of the floor beams, and a plurality of shear trusses attached to the floor panel and the structure. Moreover, the system could include at least one support bracket coupled to at least one of the support members and configured to support at least a portion of the at least one floor beam thereon.

A further aspect of the present invention provides a method for installing a floor beam assembly within a structure. The method includes positioning at least one floor beam proximate to the structure. The method also includes pivoting a pad coupled to the structure to align with a respective floor beam bracket attached to at least one of the floor beams, and attaching each pad to a respective floor beam bracket. The pivoting step could include pivoting the pad about a pivot arm attached to the structure or pivoting the pad about a pair of pivot arms coupled to the structure. The pivoting step could also include pivoting the pad about a plurality of axes to align the pad with a respective floor beam bracket. In addition, the pivoting step may include pivoting each of the pads through a respective aperture defined in the structure to align with a respective floor beam bracket. The method could further include applying an adhesive to the pad and/or a mating surface of the floor beam bracket prior to attaching each pad to a respective floor beam bracket. Furthermore, the positioning step could include positioning at least one floor beam on at least one of a plurality of support brackets attached to the structure.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Figure 1:
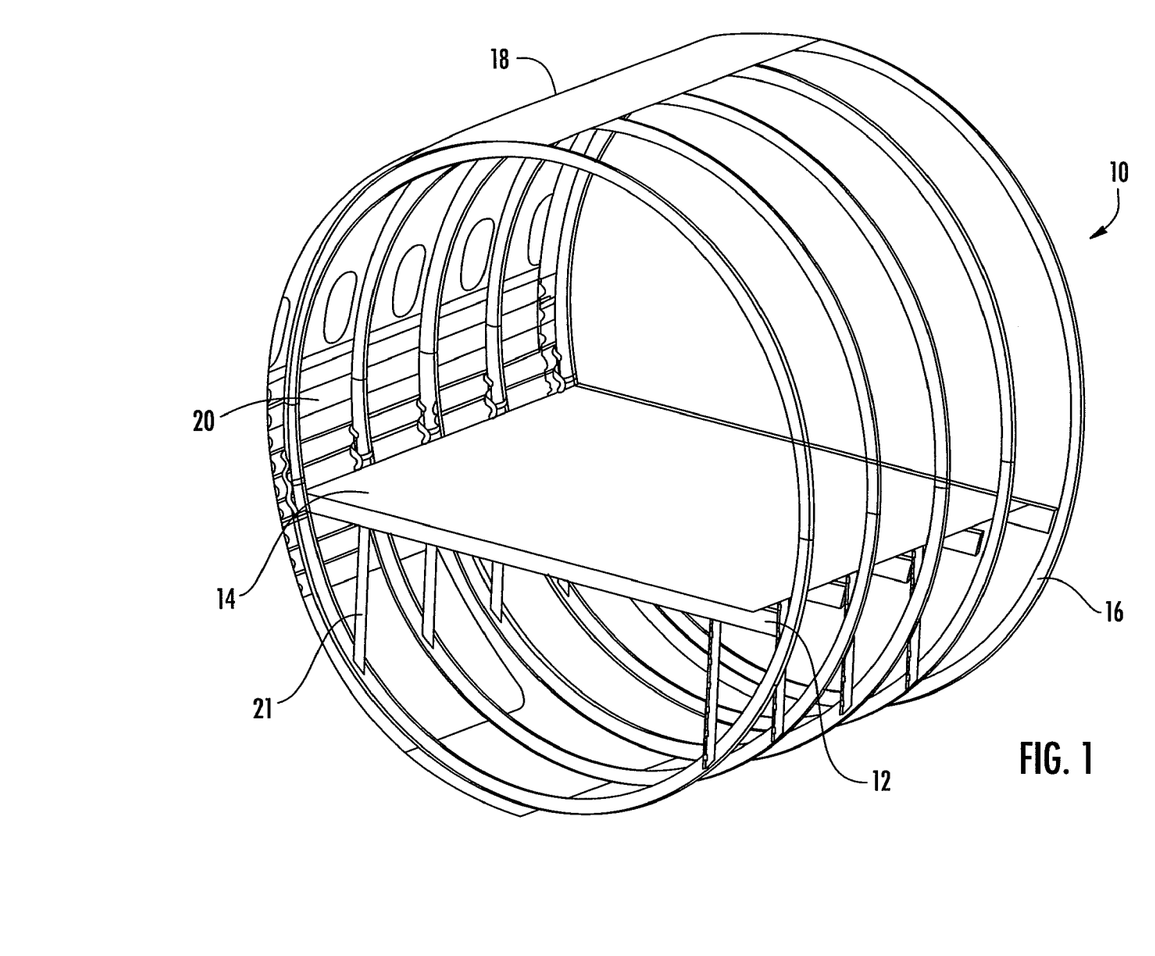
FIG. 1 is a perspective view of a structural system according to one embodiment of the present invention.

Referring now to the drawings and, in particular to FIG. 1, there is shown a system 10 for installing a floor beam assembly within an aircraft structure. In particular, the floor beam assembly includes a plurality of floor beams 12 and a floor panel 14 that is attached to a structure, such as a plurality of hoop frames 16. The floor beams 12 and floor panel 14 may be preassembled and secured to the hoop frames 16, as will be explained in further detail below. Although the system 10 is discussed in conjunction with an aircraft structure, it is understood that the system may be used in a variety of industries. Thus, the floor beam assembly could be utilized in a variety of industries where a floor beam assembly may be installed to a structure, such as in the aircraft, automotive, marine, or construction industries.

Figure 2:
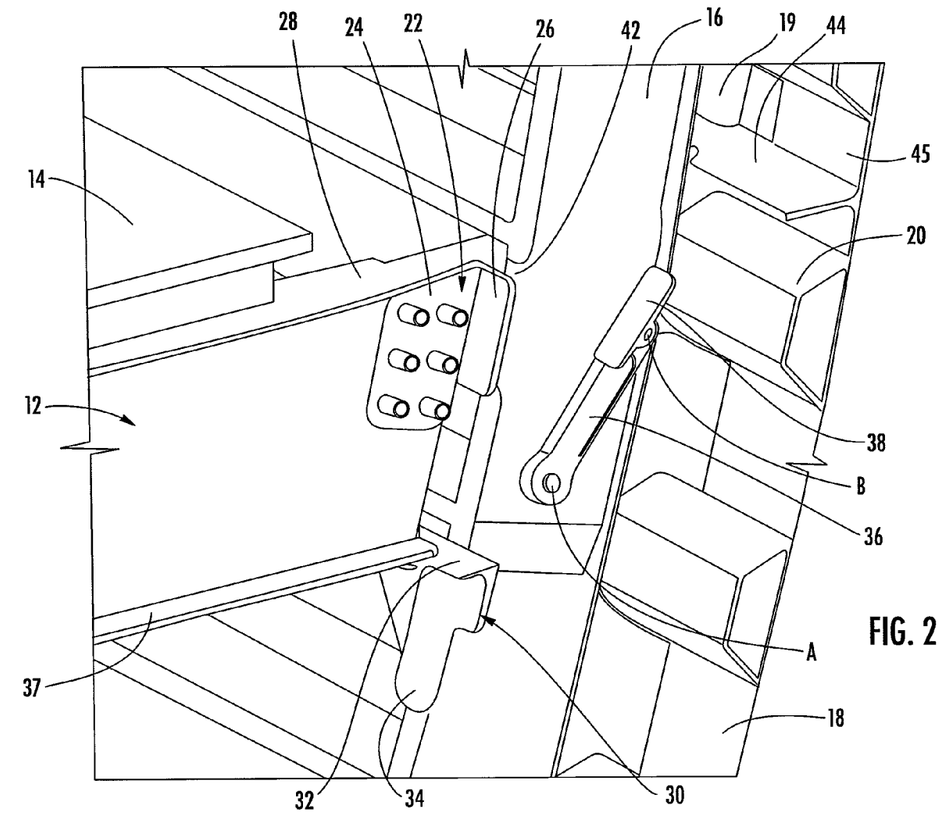
FIG. 2 is an enlarged perspective view of a floor beam assembly according to one embodiment of the present invention.

The system 10 may include a variety of components that comprise a structure. In general, an aircraft structure may include a plurality of structural supports, such as the hoop frames 16 illustrated in FIG. 1. The hoop frames 16, as known to those of ordinary skill in the art, are formed in a circular or other looped configuration to define the framework of the aircraft fuselage. The hoop frames 16 may be various cross sections, such as a C-shaped cross section, as shown in FIG. 2. The hoop frames 16 are typically a metallic material, such as aluminum, but could be a composite or combination of metallic and composite materials. Attached to the exterior of the hoop frames 16 is aircraft skin 18. The skin 18 may be attached to the hoop frames 16 using shear ties 19, as known to those of ordinary skill in the art. The skin 18 may be various materials, such as a composite (e.g., composite tape plies) and/or metallic material. The skin 18, as also known to those of ordinary skill in the art, may include stringers 20 (see FIG. 2) for adding structural support to the skin. The stringers 20 may be various configurations, such as hat-shaped as shown in FIG. 2, and secured to the aircraft skin using techniques known to those of ordinary skill in the art. Moreover, vertical stanchions 21 may be employed for adding structural support from shear loading on the floor beam assembly.

The floor panel 14 is positioned adjacent to at least one floor beam 12, but is typically positioned over a plurality of floor beams. The floor panel 14 is generally planar and of sufficient thickness and durability to provide support for objects positioned thereon. The floor panel 14 may also be various materials and configurations depending on the particular application desired, such as for supporting aircraft passengers and a seat track assembly.

Each floor beam 12 extends transversely to a longitudinal axis (i.e., in a fore-aft direction) of the aircraft structure. In particular, each floor beam 12 is paired with a respective hoop frame 16. The floor beams 12 are of sufficient length to extend proximate to opposite sides of a respective hoop frame 16. The floor beams 12 are slightly longer than the floor panel 14 (see FIG. 6) and are generally positioned below a medial plane intersecting each hoop frame 16. Typically, the floor beams 12 are configured in an I-beam cross section and are made from a composite material.

It is understood that the illustrated floor beams 12 are not meant to be limiting, as the floor beams could be various sizes and cross sections (e.g., C-shaped) in additional aspects of the present invention. Thus, the floor beams 12 may be various sizes depending on the amount of support desired. Moreover, there may be any number of floor beams 12, such as a floor beam attached to every other hoop frame 16, or more than one floor beam per hoop frame. And, the floor beams 12 may be positioned at various locations with respect to each hoop frame 16 (e.g., above or below a median plane) and orientations with respect to the longitudinal axis of the aircraft structure (e.g., obliquely or parallel). The floor beams 12 could also be various materials, such as a metallic or composite material, or a combination thereof.

Figure 7:
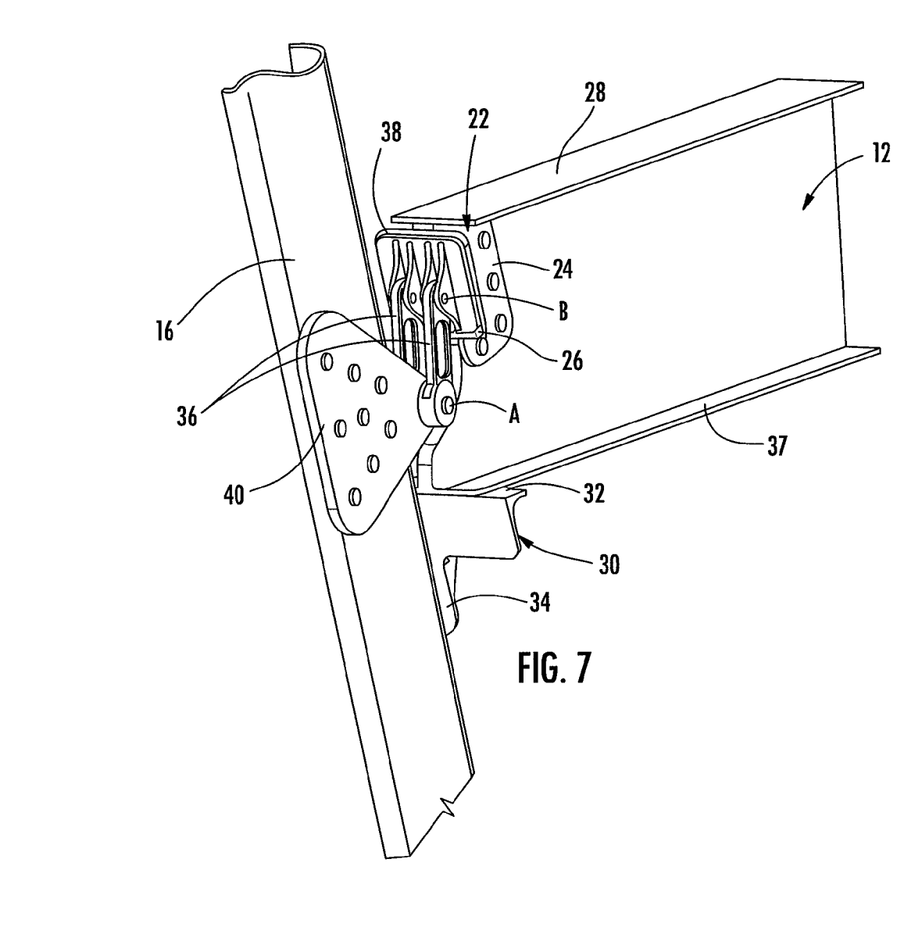
FIGS. 7 and 8 are perspective views of a floor beam assembly according to another embodiment of the present invention.
Figure 8:
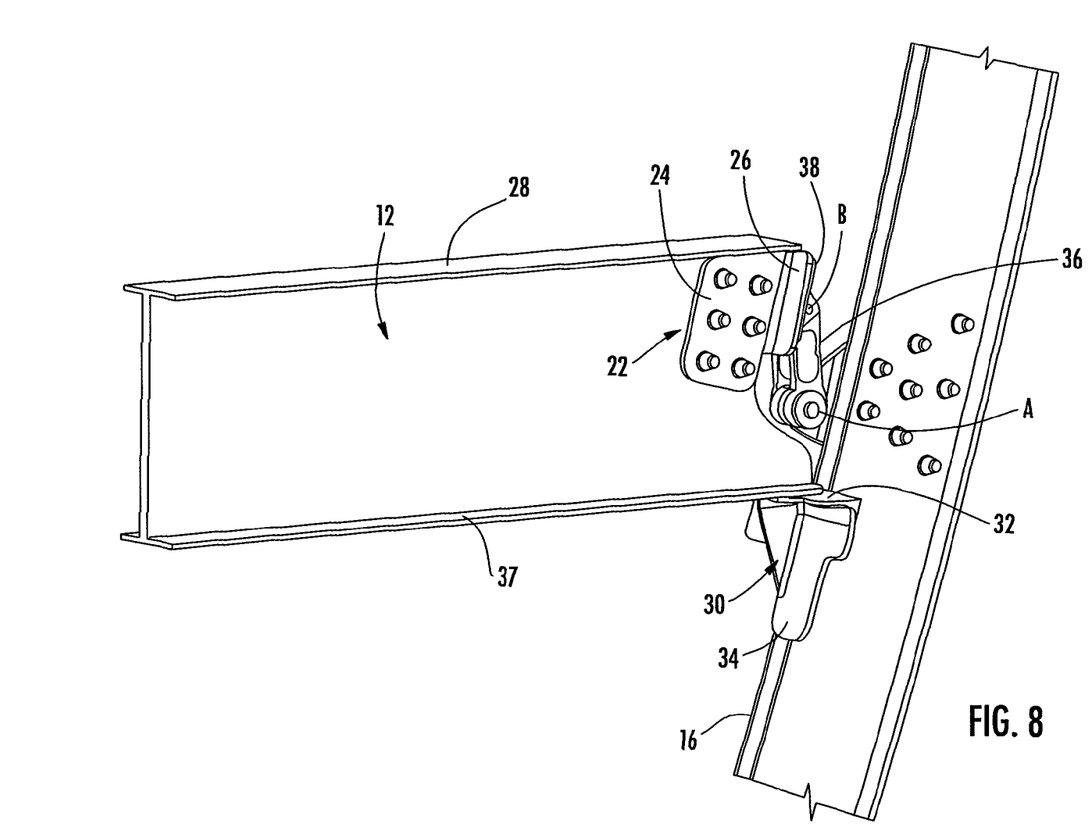

As depicted in FIG. 2, a floor beam bracket 22 is attached to opposite ends of each floor beam 12. Each floor beam bracket 22 is attached to one side of the floor beam 12 and proximate to an upper edge 28 of the floor beam. For example, in instances in which the floor beam 12 is I-shaped, the floor beam bracket 22 may be attached proximate to the upper flange of the floor beam for additionally supporting the floor beam bracket. The floor beam bracket 22 includes an attachment portion 24 that is attached to a respective floor beam 12 using fasteners, cross pins, adhesive, or the like. Moreover, the floor beam bracket 22 includes a mating portion 26 that extends transversely from the attachment portion 24. The floor beam bracket 22 can be manufactured from a metallic material, such as aluminum or titanium, or composite materials. The floor beam bracket 22 may be various configurations to facilitate engagement with a pad 38, which is explained in further detail below. For example, the floor beam bracket 22 could be configured as shown in FIGS. 7 and 8. In FIGS. 7 and 8, the mating portion 26 of the floor beam bracket 22 extends on opposite sides of a respective floor beam 12, and an attachment portion 24 is positioned on opposite sides of the floor beam 12 for attachment thereto.

A support bracket 30 may be attached to each hoop frame 16 for supporting each end of a respective floor beam 12. Each support bracket 30 includes a support surface 32 and an attachment surface 34 extending generally perpendicular therefrom. A lower edge 37 of the floor beam 12 is supported on the support surface 32. In particular, each floor beam 12 is positioned adjacent to the support surface 32, generally without using any attachment mechanism, such as fasteners. The attachment surface 34 is positioned adjacent to a respective hoop frame 16 and could be attached thereto using various techniques, such as fasteners. The support bracket 30 is typically a metallic material, such as aluminum or titanium. The configuration of the support bracket 30 may vary, as long as the attachment surface 34 facilitates attachment to the hoop frame 16, and the support surface 32 facilitates supporting of the floor beam 12.

A plurality of pivot arms 36 are attached to respective hoop frames 16. Each pivot arm 36 is configured to pivot about point A. Attached at the opposite end of the pivot arm 36 is a pad 38 such that pivoting of the pivot arm about point A also pivots the pad. Each pad 38 is also capable of independently pivoting about point B. Pins or the like may be used to secure the pivot arm 36 to the hoop frame 16 and the pad 38 to the pivot arm to facilitate pivoting thereabout. The hoop frames 16 may be reinforced in the areas of attachment to the pivot arms 36, such as by thickening the hoop frame material. In addition, the hoop frames 16 may define an aperture 42 in order to allow each pad 38 to pivot through the aperture so as to operably contact a respective floor beam bracket 22. Thus, a portion of the hoop frame 16 may be removed, or otherwise never formed, in order to define the aperture 42. The pivot arms 36 and pads 38 are typically a metallic material, such as titanium or aluminum.

It is understood that the pivot arms 36 may be various configurations in order to allow pivoting about the hoop frames 16. For example, FIGS. 7 and 8 illustrate an alternative embodiment of the present invention, where a pair of pivot arms 36 are attached to a pivot bracket 40. The pivot bracket 40 is attached to one side (or opposite sides) of a respective hoop frame 16 and is configured such that the pivot arms 36 are spaced inwardly and away from the hoop frame 16. Thus, an aperture 42 is not required in this particular embodiment to allow for pivoting of the pivot arm. The pivot bracket 40 may be attached to the hoop frame 16 using fasteners, cross pins, adhesives, or the like. FIGS. 7 and 8 also demonstrate that the floor beam 12 may be modified to allow the pivot arms 36 to be spaced outwardly from the hoop frame 16 and effectively between an end of a floor beam and the corresponding hoop frame. In particular, FIG. 8 illustrates an S-shaped profile at the end of the floor beam 12, although other profiles could be employed to allow for free rotation of the pivot arms 36.

Figure 3:
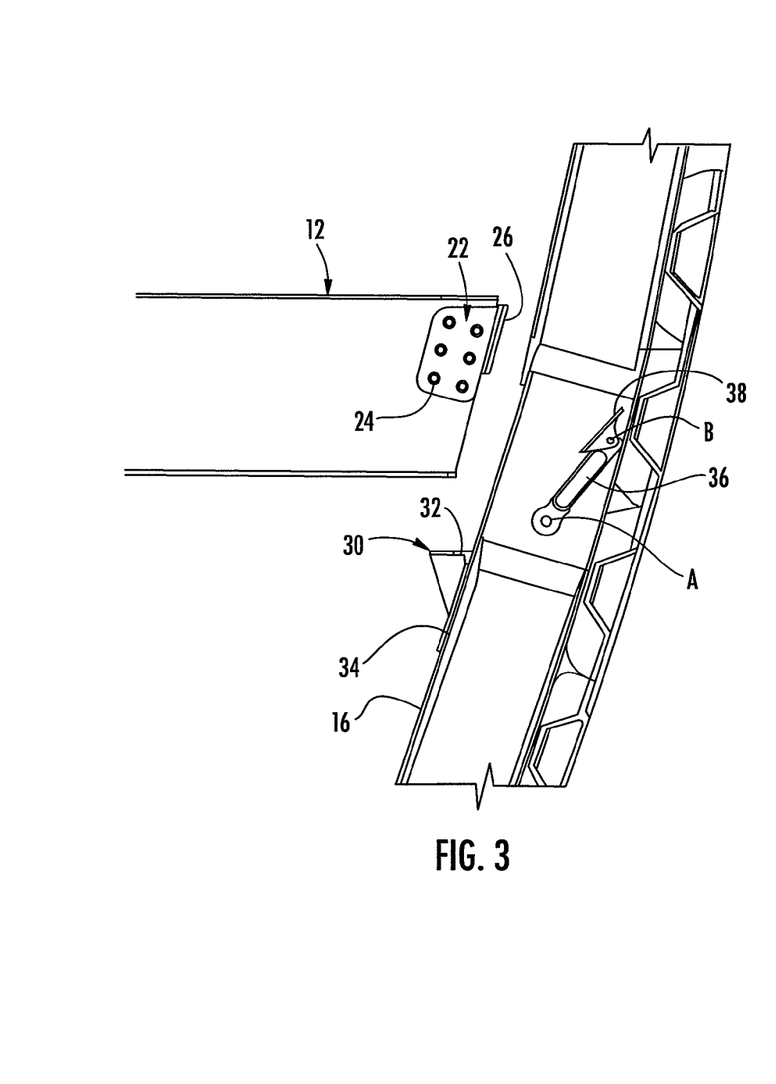
FIGS. 3-6 illustrate elevation views of the installation of a floor beam to an aircraft structure according to an embodiment of the present invention.
Figure 4:
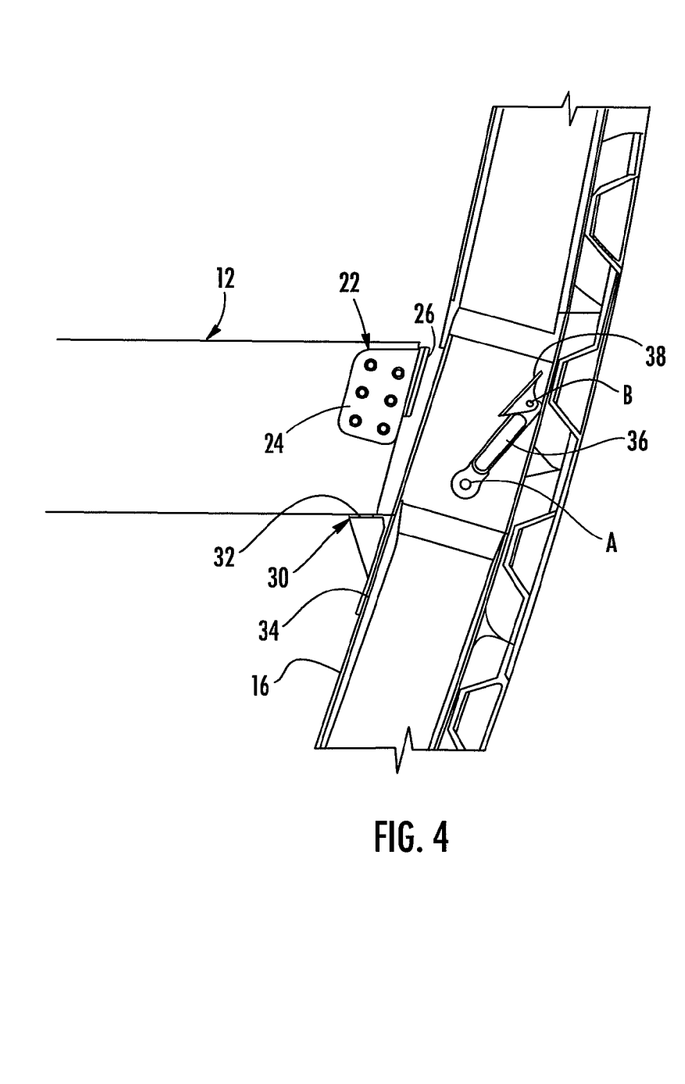
Figure 5:
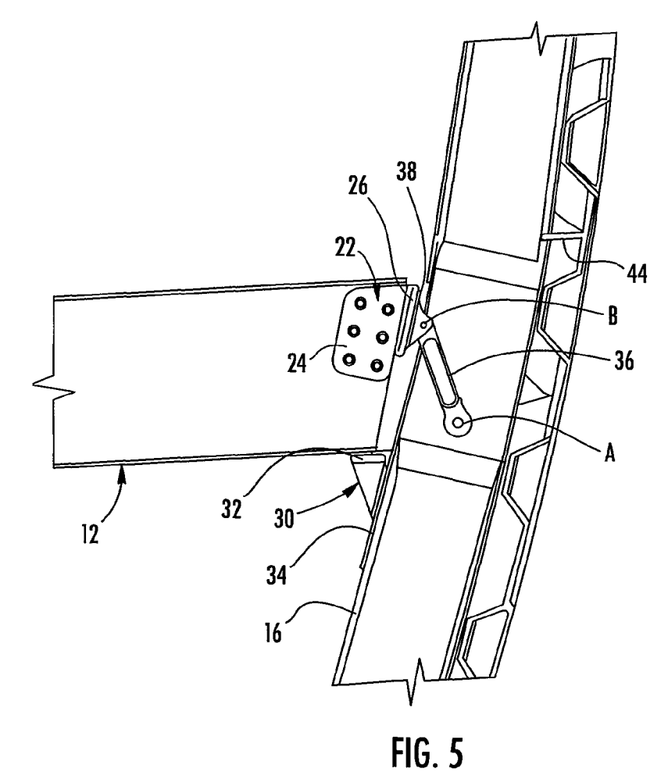

FIGS. 3-6 depict the operations used to install a floor beam assembly to an aircraft structure according to one embodiment of the present invention. Namely, FIG. 3 shows that the floor beam 12 and the floor beam bracket 22 are typically preassembled, and then the floor beam is positioned adjacent, and in a weight-bearing relationship, to a supporting surface 32 of the support bracket 30, as depicted in FIG. 4. FIG. 5 demonstrates that the pivot arms 36 may then be pivoted about pivot A towards the mating surface 26 of the floor beam bracket 22. Moreover, the pad 38 may be pivoted about pivot B to ensure proper radial alignment with the mating surface 26 of the floor beam bracket 22. In this regard, the pivot arms 36 and the pads 38 are generally pivoted such that the pads are flush and in uniform contact with a respective mating surface 26 of the floor beam bracket 22. In addition, the mating surface 26 of the floor beam bracket 22 could be oversized to further facilitate proper alignment with the pad 38. Thus, the preassembled floor beams 12 and floor beam brackets 22 may be readily positioned on the support brackets 30 and the pads 38 rotated to engage respective mating surfaces 26, while also accommodating for any fore or aft misalignment of the floor beams to the hoop frames 16. Moreover, the engagement of the pads 38 with the mating surfaces 26 of the floor beam brackets 24 is capable of securing the floor beams 12 adjacent to the support brackets 30.

An adhesive is typically used to attach the pads 38 to respective mating surfaces 26 of the floor beam brackets 22. The surface of the pads 38 and the mating surfaces 26 of the floor beam brackets 22 may be pre-doped with a two-part adhesive, with one part on the pad and one part on the mating surface. Alternatively, a one-part paste adhesive may be applied to the pad 38 and/or the mating surface 26 before bringing the surfaces into engagement with one another. For example, the adhesive could be a two-part structural paste adhesive (e.g., Hysol® EA-9394 manufactured by Henkel Corp.).

Figure 6:
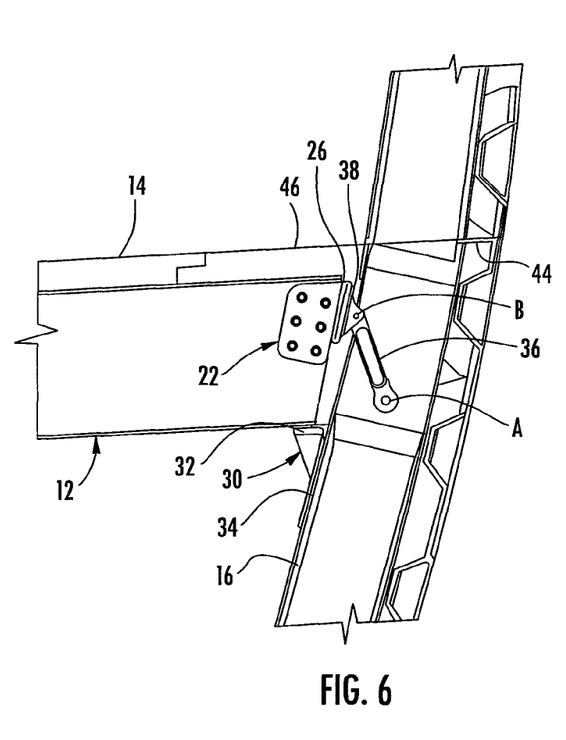
Figure 9:
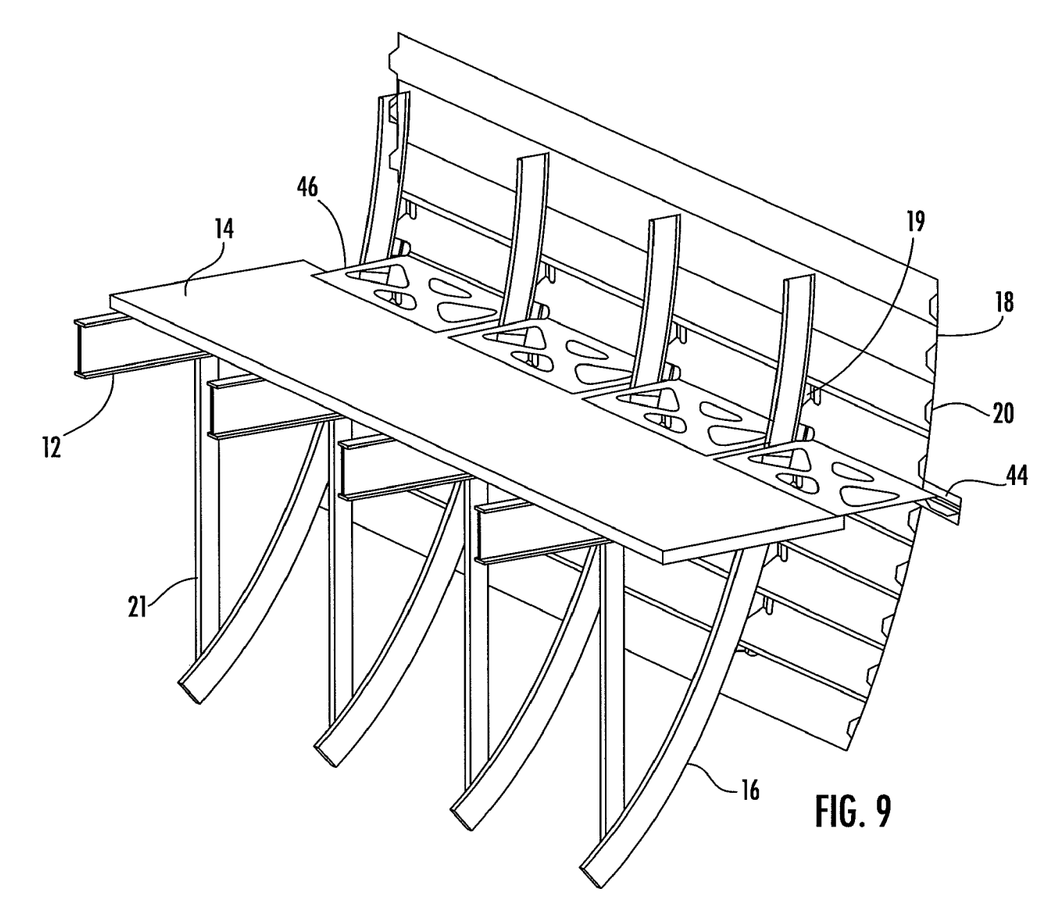
FIG. 9 is a perspective view of a portion of a structural system according to one embodiment of the present invention.

To further secure the floor beam assembly to the aircraft structure, shear trusses 46 are secured to the floor panel 14 and aircraft structure, as shown in FIGS. 6 and 9. In particular, FIGS. 2 and 9 illustrate that the aircraft structure includes a plurality of shelves 44 having a base 45 positioned adjacent to the aircraft skin 18 and between a pair of stringers 20. Each shelf 44 extends outwardly towards a respective hoop frame 16 such that the shear truss 46 is capable of being positioned adjacent to the shelf 44 and the floor panel 14. The shear trusses 46 may be a composite material that is attached to the floor panel 14 and shelf 44 with an adhesive, although the shear trusses could be a metallic material and secured with fasteners and the like.

Thus, embodiments of the present invention may provide several advantages. For example, the floor beams 12, floor panel 14, and/or floor beam brackets 22 may be preassembled and attached to an aircraft structure. Thus, the floor beam assembly may be readily positioned and secured to the aircraft structure. Moreover, the pivot arms 36 and pads 38 may attach the floor beams 12 to the structure without using fasteners, which may provide for more efficient installation. Thus, embodiments of the present invention eliminate the need for mate-drilled holes and reduce the probability of introducing foreign object debris in the form of fasteners or other debris resulting from removal of material to accommodate the fasteners. In addition, the pivot arms 36 and pads 38 may be configured to accommodate radial and fore/aft misalignment of the pads and floor beam brackets 22.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A floor beam assembly comprising:
   at least one floor beam;
   at least one floor beam bracket attached to a respective floor beam;
   at least one pivot arm having a longitudinal axis and attached to, and configured to pivot about, a structure along a first axis; and
   a pad attached to, and configured to pivot about, the at least one pivot arm along a second axis, wherein the longitudinal axis extends between the first axis and the second axis, and wherein the at least one pivot arm is configured to pivot the pad into engagement with a respective floor beam bracket to be attached thereto.

2. The assembly according to claim 1, wherein each pad is pivotally attached to the at least one pivot arm, and wherein each pad is capable of pivoting relative to the at least one pivot arm to align with a respective floor beam bracket.

3. The assembly according to claim 1, further comprising an adhesive applied to at least one of each pad and a mating surface of each floor beam bracket.

4. The assembly according to claim 3, wherein the adhesive comprises a two-part paste adhesive.

5. The assembly according to claim 1, wherein each pad is attached to a pair of pivot arms.

6. The assembly according to claim 1, wherein each floor beam comprises a composite material.

7. The assembly according to claim 1, further comprising at least one support bracket attached to the structure and configured to support at least a portion of the at least one floor beam thereon.

8. The assembly according to claim 7, wherein each floor beam is configured to rest on the at least one support bracket in a weight-bearing relationship.

9. The assembly according to claim 1, wherein a mating surface area of each floor beam bracket is larger than a mating surface area of a respective pad.

10. The assembly according to claim 1, wherein the at least one bracket comprises a planar mating surface, and wherein the pad comprises a planar surface configured to be positioned in flush and uniform contact with the planar mating surface of the floor beam bracket for attachment thereto.

11. The assembly according to claim 1, further comprising a plurality of floor beam brackets, pivot arms, and pads, wherein the at least one floor beam comprises first and second opposing ends, wherein one of the floor beam brackets is attached to the first opposing end and another floor beam bracket is attached to the second opposing end, and wherein one of the pads is configured to pivot about a first pivot arm and attach to the floor beam bracket at the first opposing end and another pad is configured to pivot about second pivot arm and attach to the floor beam bracket at the second opposing end.

12. The assembly according to claim 1, wherein the first and second axes do not intersect one another.

13. The assembly according to claim 1, wherein the at least one pivot arm comprises a first end and a second opposite end and the longitudinal axis extends between the first and second ends, and wherein the pivot arm is attached to the structure proximate to the first end and the at least one pad is attached to the pivot arm proximate to the second end.

14. A system for installing a floor beam assembly comprising:
   a structure comprising a plurality of support members;
   a plurality of floor beams positioned proximate to at least one of the support members;
   at least one floor beam bracket attached to a respective floor beam;
   at least one pivot arm having a longitudinal axis and attached to, and configured to pivot about, at least one of the support members along a first axis; and
   a pad attached to, and configured to pivot about, the at least one pivot arm along a second axis, wherein the longitudinal axis extends between the first axis and the second axis, and wherein the at least one pivot arm is configured to pivot the pad into engagement with a respective floor beam bracket to be attached thereto.

15. The system according to claim 14, wherein each pivot arm is directly attached to at least one of the support members.

16. The system according to claim 15, wherein at least a portion of each support member defines an aperture, and wherein each pad is configured to be pivoted through the aperture and align with a respective floor beam bracket.

17. The system according to claim 14, further comprising at least one pivot arm bracket attached to a respective support member.

18. The system according to claim 17, wherein a pair of pivot arms are attached to a respective pivot arm bracket.

19. The system according to claim 14, wherein each pad is pivotally attached to the at least one pivot arm, and wherein each pad is capable of pivoting relative to the at least one pivot arm to align with a respective floor beam bracket.

20. The system according to claim 14, further comprising an adhesive applied to at least one of each pad and a mating surface of each floor beam bracket.

21. The system according to claim 20, wherein the adhesive comprises a two-part paste adhesive.

22. The system according to claim 14, further comprising a floor panel positioned adjacent to a plurality of the floor beams.

23. The system according to claim 22, further comprising a plurality of shear trusses attached to the floor panel and the structure.

24. The system according to claim 14, wherein the structure comprises an aircraft structure, and wherein the support members comprise a plurality of hoop frames.

25. The system according to claim 14, further comprising at least one support bracket coupled to at least one of the support members and configured to support at least a portion of the at least one floor beam thereon.

26. A method for installing a floor beam assembly within a structure comprising:
   positioning at least one floor beam proximate to the structure;
   pivoting a pad coupled to the structure into engagement with a respective floor beam bracket attached to at least one of the floor beams such that the floor beam bracket opposes further pivoting of the pad, wherein pivoting comprises pivoting the pad about a plurality of axes to align with a respective floor beam bracket, and wherein the axes do not intersect one another; and
   attaching each pad to a respective floor beam bracket while the floor beam bracket and pad are in engagement with one another.

27. The method according to claim 26, wherein pivoting comprises pivoting the pad about a pivot arm attached to the structure.

28. The method according to claim 26, wherein pivoting comprises pivoting the pad about a pair of pivot arms coupled to the structure.

29. The method according to claim 26, wherein pivoting comprises pivoting the pad about a plurality of axes to align with a respective floor beam bracket, and wherein the axes extend parallel to one another.

30. The method according to claim 26, further comprising applying an adhesive to at least one of the pad and a mating surface of the floor beam bracket prior to attaching each pad to a respective floor beam bracket.

31. The method according to claim 26, wherein pivoting comprises pivoting each of the pads through a respective aperture defined in the structure to align with a respective floor beam bracket.

32. The method according to claim 26, wherein positioning comprises positioning the at least one floor beam on at least one of a plurality of support brackets attached to the structure.

33. A system for installing a floor beam assembly comprising:
   an aircraft structure comprising a plurality of hoop frames;

a plurality of floor beams positioned proximate to at least one of the hoop frames;

at least one floor beam bracket attached to a respective floor beam;

at least one pivot arm pivotally attached to at least one of the hoop frames; and a pad attached to the at least one pivot arm, wherein the at least one pivot arm is configured to pivot the pad to a position proximate to a respective floor beam bracket to be attached thereto.

34. A method for installing a floor beam assembly within a structure comprising:

positioning at least one floor beam proximate to the structure;

pivoting a pad coupled to the structure into engagement with a respective floor beam bracket attached to at least one of the floor beams such that the floor beam bracket opposes further pivoting of the pad, wherein pivoting comprises pivoting each of the pads through a respective aperture defined in the structure to align with a respective floor beam bracket; and attaching each pad to a respective floor beam bracket while the floor beam bracket and pad are in engagement with one another.

* * * * *